(12) United States Patent
Velev et al.

(10) Patent No.: US 10,891,572 B2
(45) Date of Patent: Jan. 12, 2021

(54) INTERFACE ENABLING MONITORING OF PERFORMANCE OF EXECUTED PROCESSES

(71) Applicant: SAP SE, Walldorf (DE)

(72) Inventors: Mincho Velev, Sofia (BG); Aleksandar Zlatkovski, Sofia (BG)

(73) Assignee: SAP SE, Walldorf (DE)

( * ) Notice: Subject to any disclaimer, the term of this patent is extended or adjusted under 35 U.S.C. 154(b) by 664 days.

(21) Appl. No.: 15/414,649

(22) Filed: Jan. 25, 2017

(65) Prior Publication Data

US 2018/0211191 A1 Jul. 26, 2018

(51) Int. Cl.
*G06Q 10/06* (2012.01)
(52) U.S. Cl.
CPC ................ *G06Q 10/0633* (2013.01)
(58) Field of Classification Search
None
See application file for complete search history.

(56) References Cited

U.S. PATENT DOCUMENTS

| 2005/0192988 A1* | 9/2005 | Barsness | G06F 16/24556 |
| 2014/0006000 A1* | 1/2014 | Said | G06F 11/3419 703/22 |
| 2016/0321099 A1* | 11/2016 | Cismas | H04L 41/0893 |
| 2019/0079736 A1* | 3/2019 | Kaduwela | G06F 8/35 |

OTHER PUBLICATIONS

D.A. Milner, V.C. Vasiliou Computer process control monitoring, 1986 (Year: 1986).*

* cited by examiner

*Primary Examiner* — Akosua Kyereme-Tuah
(74) *Attorney, Agent, or Firm* — Buckley, Maschoff & Talwalkar LLC

(57) ABSTRACT

An interface is provided for process status determination. The provided interface includes logic for process status determination based on analytics rules for evaluation of processes that are executed at an engine, such as a BPM engine. Process instances are executed through the engine. The execution of process instances may be associated with performing execution tasks at external systems. When the process instances are executed through the process engine, process definitions may be stored at a database coupled to the engine. Enhanced metadata is stored for the process instances' executions at a database metadata table. The enhanced metadata may be stored and utilized for process status determination according to the analytics rules. Process status results are generated based on the enhanced metadata. The enhanced metadata may be evaluated according to the defined analytics rules. An aggregation result is generated based on evaluation of the determined process status results.

17 Claims, 6 Drawing Sheets

INTERFACE ENABLING MONITORING OF PERFORMANCE OF EXECUTED PROCESSES

BACKGROUND

Business Process Management (BPM) may provide a systematic approach to define a more effective organization's workflow, which can be adapted to a dynamic environment. A BPM platform can handle complex execution of flows corresponding to defined activities in a process. BPM Platforms may be targeted at different type of users, including business people, developers, system administrators, etc. A BPM platform may include a process engine to execute processes. Executable business processes are based on a diagram that represents different steps in an execution flow. Executable business processes are associated with defined technical details required for the process execution. A BPM platform may act as a coordinator between external parties associated with the execution of steps defined in the flows. Executable business processes may be part of a software development lifecycle and may be associated with requirements defined for related software or software components. Executable business processes may be deployed on a BPM system. Data associated with the execution of the business processes may be stored at a database (DB). For example, data stored for processes may include information for how long a process instance or an activity instance takes, who submitted the data and when, the order number associated with a given process step of a process, and so on.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for generating status analytics for executed processes by an engine are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A software solution may be built on business processes to structure execution of tasks performed at different systems by different stakeholders. Building features for a software application becomes a lot easier when structuring the application around an executable business process. Through defining an executable process, managing of waiting states, timers, asynchronous execution of tasks can be integrated easily. A business process can express such a structure in a compact manner when working with the fundamental instruments that a BPM platform offers, e.g., messaging services, connectivity services, runtime engine, etc. Storing data for executed processes may be configured. From such information, various kinds of reports can be generated. The reports may include statistical analysis over the data. For example, the average time for an activity in the process may be monitored. Based on such process monitoring, improvements on the system environment and task definitions and order may be generated.

Figure 1:
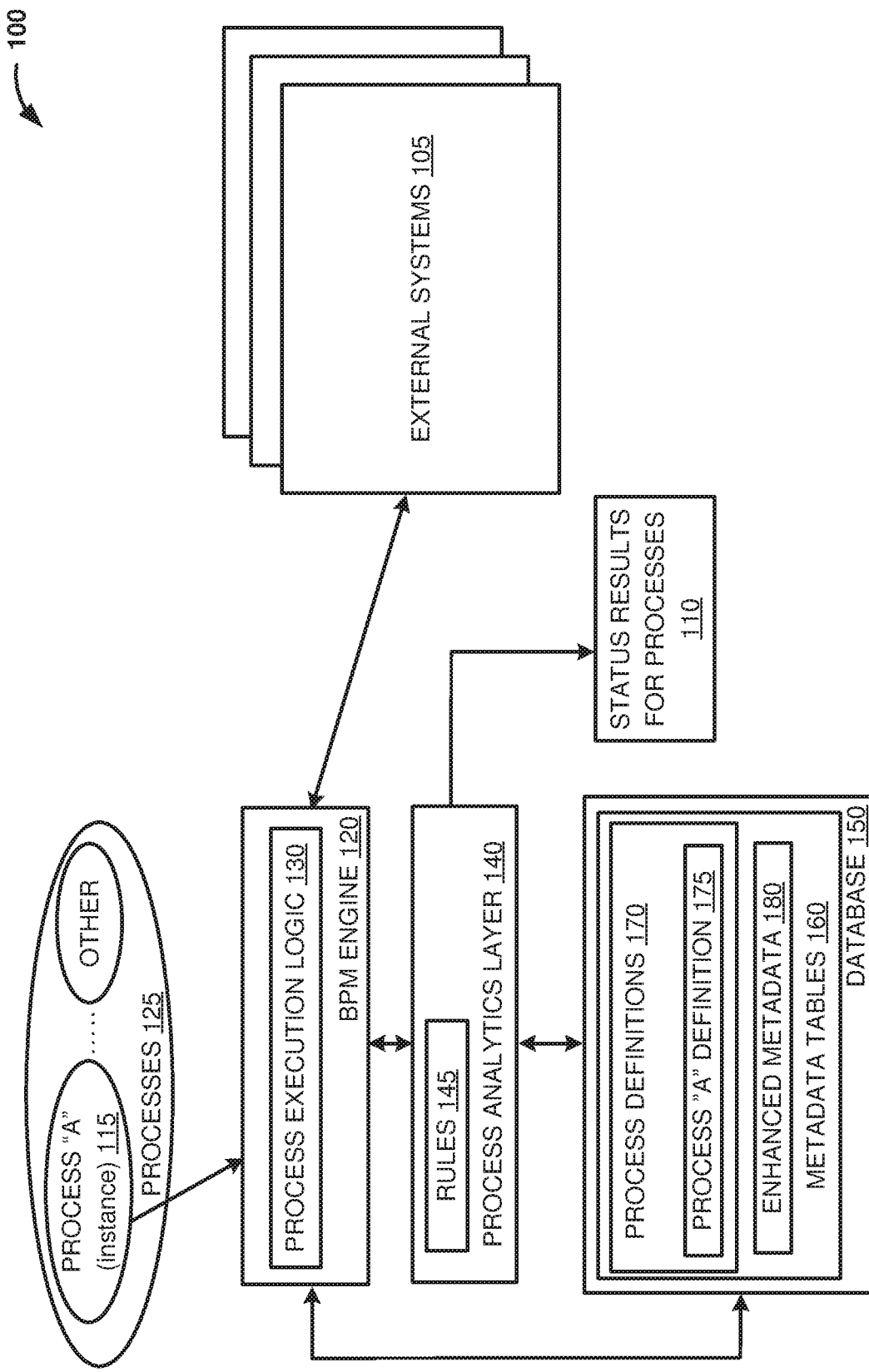
FIG. 1 is a block diagram illustrating an exemplary system for generating process status results, according to one embodiment.

FIG. 1 is a block diagram illustrating an exemplary system 100 for generating process status results, according to one embodiment. BPM Engine 120 is an execution engine for process flows defined according to a notation. For example, the notation may be a graphical notation describing process steps in a flow. The BPM Engine 120 is associated with database (DB) 150 for persisting data associated with processes that run through the BPM Engine. The BPM Engine 120 receives requests for execution of process instances from processes 125. For example, an instance of process "A" 115. The processes 125 may be associated with process definitions 170. The process definitions 170 may be part of data stored at database table at the DB 150. The process definitions 170 are metadata for the processes. A process definition defines the structure of a process. The BPM Engine 120 uses the definition of the process 125 to run the steps as defined in the flow. The process definition may be created according to a modeling language for modeling process definitions, such as Business Process Model and Notation (BPMN) 2.0. BPMN 2.0 is a graphical representation for specifying business processes in a business process model. The defined processes may be processes characterizing features of a software application, where such processes includes tasks that are associated with triggering execution on different hardware systems that could be associated with different software solutions.

In one embodiment, at the BPM Engine 120, one can deploy one or more processes from processes 125. The processes 125 may be defined in BPMN 2.0 XML format. For example, process "A" 115 may be deployed on the BPM Engine 120 and XML files corresponding to the process "A" definition 175 may be parsed and transformed into a process definition graph structure. The generated graph structure of tasks may be executed by the BPM Engine 120. The BPM Engine 120 includes process execution logic 130 to perform the execution of processes. The execution of the process "A" may be associated with performing steps at one or more external systems 105. The steps defined for the processes are not limited to performance at the external systems 105 and may also be associated with required user interactions, external application services, data storages, etc.

For example, process "A" 115 may be an instance of process for requesting vacation days. Such process may be defined with process definition "A" 175. The process "A" 115 may define that a request may be sent by an employee via e-mail to a supervisor or manager, with the request including a specified time period and reason for the request. Based on an evaluation of the request, data associated with the result of whether the request is approved or not may be stored at an HR system, and further, the data for available vacation days for the employee may be updated and stored at the same HR system or another associated system or storage.

In one embodiment, the BPM Engine 120 is associated with a process analytics layer 140, which provides an interface for status determination for processes that are run on the BPM Engine 120. The process status determination logic implemented at the process analytics layer 140 is related to defined rules 145 for evaluation of steps of process executions. The evaluation of the process execution may be related to evaluation of metadata for the executed processes, stored at a database, such as the DB 150. The BPM Engine 120 and the process analytics layer 140 may run on one server. In one example, the server may be in communication with the DB 150, and in another example, the BPM Engine 120, the process analytics layer 140, and the DB 150 may run on one server. Alternatively, the BPM Engine 120 and the process analytics layer 140 may run on separate servers and communicate through a network to each other and to the DB 150.

When a process instance is executed through the BPM Engine 120, metadata related to the process is stored. Such metadata may be stored in table format at the DB 150. The metadata may include data for the processes, such as data for identification of the process, time stamp of execution, user identifier (id) associated with triggering the process execution, indication whether the process has failed or is completed successfully, etc. Such metadata may be extended to include more enhanced data to facilitate tracking of errors and exception behavior during the process execution. The storage of metadata at the metadata tables 160 may be defined according to an enhanced data model for storing information related to process status execution. In such manner, enhanced metadata 180 is the metadata stored at the database 150, which extends an ordinary history metadata for process execution. The additional data is defined to be stored at the metadata tables 160 and form the enhanced metadata 180.

The type of metadata that is stored at the enhanced metadata 180 is configurable, and the corresponding data model may be updated based on a change in the requirements for determining a process status. It may be configured that metadata is stored for processes that have failed to complete successfully a step from the process execution. The enhanced metadata 180 may be used for process status determination at the process analytics layer 140. For example, process statuses may be defined in a limited list of defined status values.

The enhanced metadata 180 stored at the DB 150 may be invoked by the process analytics layer 140 and evaluated based on the rules 145. For example, the enhanced metadata 180 may include a metadata such as shown in Table 1. Table 1 represents exemplary metadata for process instances, which include additional data associated with details logged during the execution of the process instances. The stored details are associated with logged failure events during the process execution. The details as stored in the column "Exception messages" are configured to be stored in the enhanced metadata, as suggested in Table 1. The exception messages are stored in relation to process instances, identified by process instance IDs; failures of tasks, which are identified by task name; user identified by unique id, etc. These exception messages may be evaluated based on the rules 145 to determine a process status result for the processes that are executed through the BPM Engine 120. The rules 145 may include conditions defined based on existing attributes of data (such as metadata table columns) in the enhanced metadata tables 160.

TABLE 1

| ID | Process_Instance ID | Process_DEF_KEY | Failure_Date | Failure_Task | User_ID | Except. MSG |
|---|---|---|---|---|---|---|
| 1 | 764001 | provision.platform.install | 2016-04-22 12:48:38 | Validate Parameters | I012345 | Couldn't execute activity <serviceTask id="validateParameters">: Either size or setup_template is not valid |
| 2 | 764354 | provision.platform.install | 2016-04-23 14:38:20 | reserveVM | I012346 | An Error in GMP.<p> You can create a ticket on component "X" at https://ticket.direct.com |
| 3 | 764563 | provision.platform.decommission | 2016-04-24 11:40:08 | remove_from_monitoring | P012347 | Couldn't execute activity <serviceTask id="remove_from_monitoring"; Call to Monitoring Node failed with code: 500 |
| 4 | 775960 | provision.platform.update | 2016-04-26 11:40:08 | CheckDB UpdateTask | I012345 | Task db_cheek_update got response: "The provisioning was executed successfully, but …." |

The defined rules 145 are associated with the process status determination. The rules 145 may be presented in different format and may be associated with determining a process status, based on an evaluation of one or more conditions related to a type of data stored at the enhance metadata 180. For example, a first rule may evaluate a condition, whether a process instance (with a given process id) has finished without errors. Such evaluation may be performed, through searching in the metadata to identify data records related to the process instances (searching the process instance id). Based on evaluation of the enhanced metadata 180 according to the rules 145, status results for processes 110, triggered through the BPM Engine 120, may be generated. The generation of the status results for processes 110 may be generated based on a received request to provide status analytics over the performance of processes at the BPM Engine 120.

Figure 2:
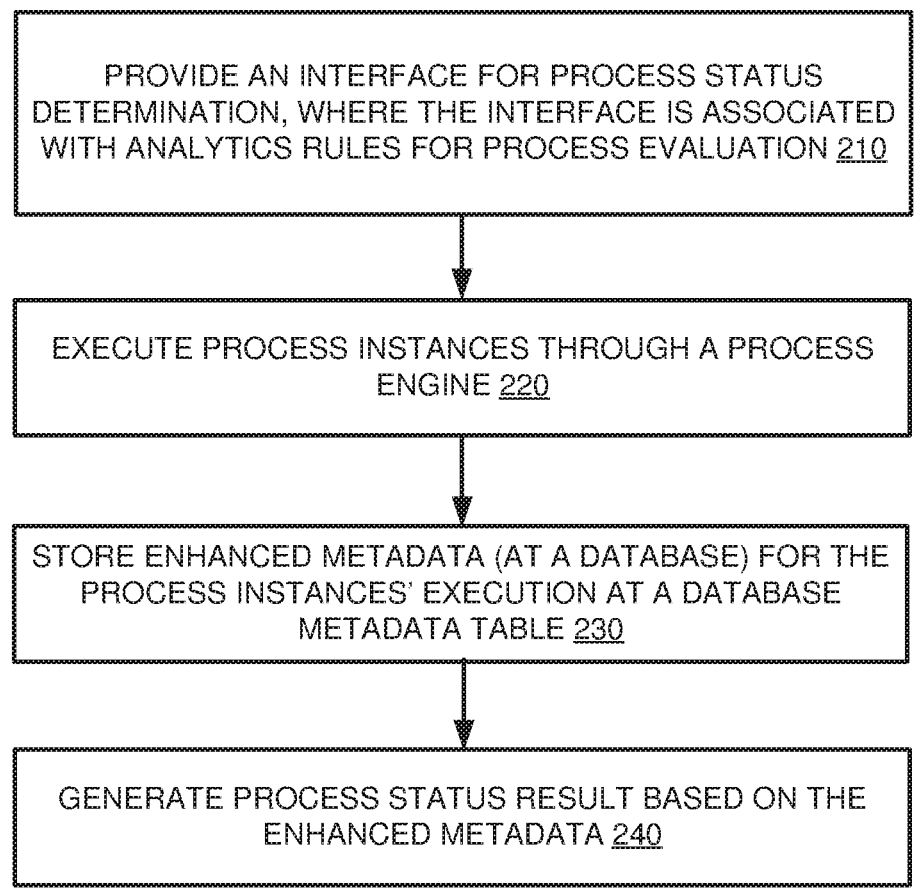
FIG. 2 is a flow diagram illustrating a process for generating process status results, according to one embodiment.

FIG. 2 is a flow diagram illustrating a process 200 for generating process status results, according to one embodiment. At 210, an interface is provided for process status determination. The interface is associated with analytics rules for process evaluation. The analytics rules may correspond to the rules 145 defined at the process analytics layer 140 of the system 100 for generating process status results, FIG. 1. The provided interface includes logic for process status determination for processes that are executed at an engine, such as a BPM engine. The process status determination may be performed during the process execution and/or when a process has already finished and has no more process steps left for execution. At 220, process instances are executed through a process engine. The process instances may be such as the described processes 125 at FIG. 1. When the process instances are executed through the process engine, process definitions (such as process definitions 170) may be stored at a DB coupled to the process engine. The DB that stores such metadata for process definitions may be such as the DB 150, FIG. 1.

At 230, enhanced metadata is stored for the process instances' executions at a database metadata table. The metadata table including the enhanced metadata may be correspond to the enhance metadata 180 at the metadata tables 160, FIG. 1. The enhanced metadata may be stored according to a defined data model for storing data, which may be utilized for process status determination according to the analytics rules. At 240, process status result is generated based on the enhanced metadata. The enhanced metadata may be evaluated according to the defined analytics rules. For example, a process status may be "Successfully Finished", "Successfully Finished with Manual Interaction". "Aborted", "Failed", etc. Such statuses may be defined at a different granularity and different level of detail. The status may be determined in relation to a request, received from a user and/or external system/application.

Figure 3:
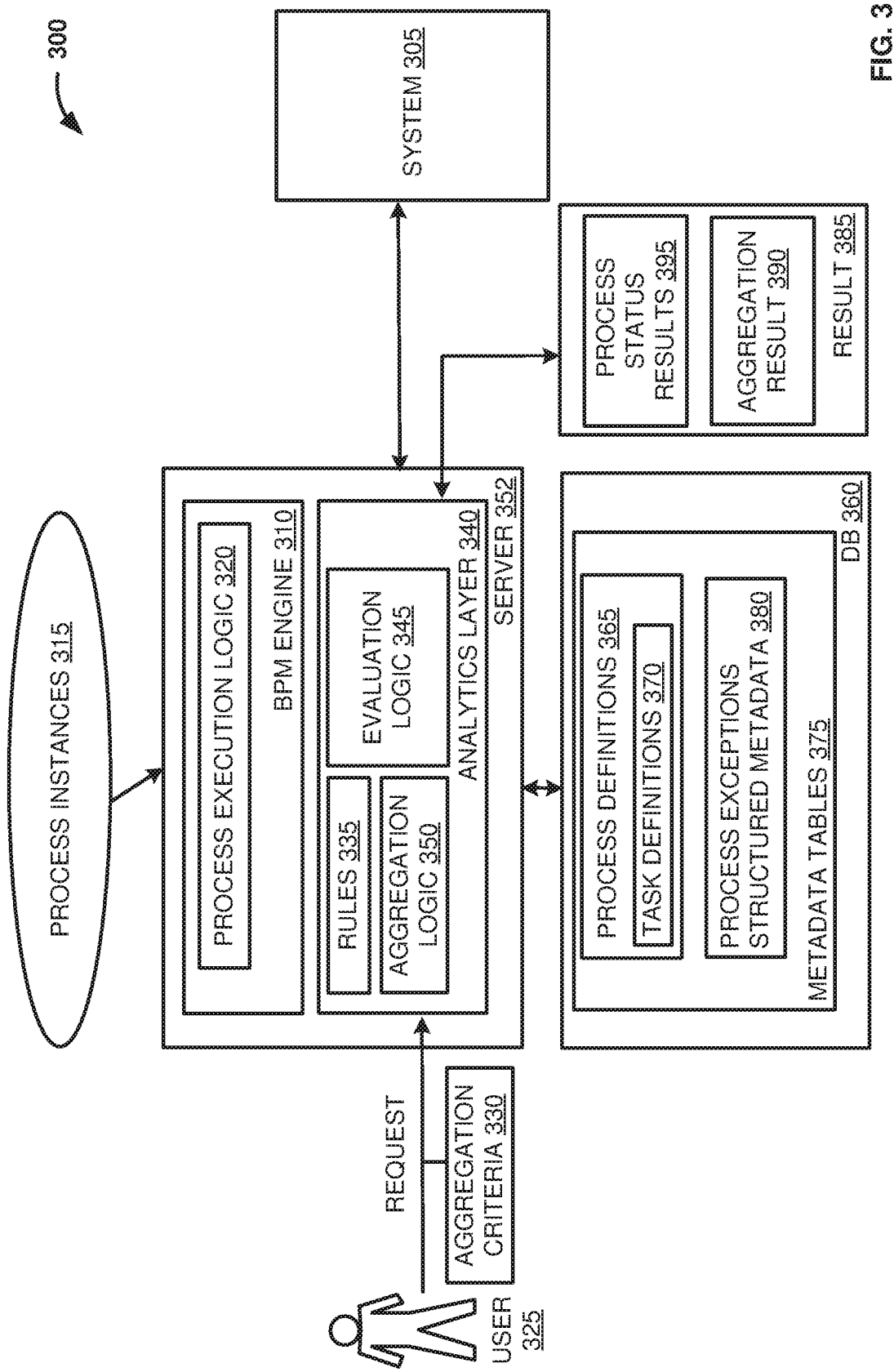
FIG. 3 is a block diagram illustrating a system for enhancing and aggregating data stored for executed processes to generate process result data, according to one embodiment.

FIG. 3 is a block diagram illustrating a system 300 for enhancing and aggregating data stored for executed processes to generate process result data, according to one embodiment. The system 300 may include features of the described above system 100, FIG. 1 and the described process 200, FIG. 2. Process instances 315 are executed through a BPM Engine 310. The BPM Engine 310 may be such as the BPM Engine 120, FIG. 1. The BPM Engine 310 includes process execution logic 320 for executing received information for process instances 315 and performs tasks/operations on related systems, such as system 305. The BPM Engine 310 is associated with an analytics layer 340, which may provide logic for evaluation of executed processes to determine process status result. The BPM Engine 310 and the analytics layer 340 are running on a shared server 352. The server 352 is in communication with system 305, where tasks from the executed process instances 315 are performed.

When the process instances 315 are executed through the BPM Engine 310, metadata related to the processes are stored in metadata tables 375. Such metadata may be stored in table format at the DB 360. The metadata that may be stored may correspond to the metadata stored at the DB 150, FIG. 1. Such metadata may include data for the process definitions 365, which includes task definitions 370 metadata. Further, the DB 360 stores data for identification of the process instances 315 and their execution including time stamp of execution, user identifier (id) associated with triggering the process execution, indication whether the process has failed or the process is completed successfully, etc. The storage of metadata at the metadata tables 160 may be defined according to an enhanced data model for storing information related to process status execution. The stored metadata at metadata table 375 includes process exceptions structured metadata 380, which extends an ordinarily history metadata for process execution. In such manner, the metadata is stored in a structured form relevant for tracking errors, exceptions, and events that are recorded during process execution. Therefore, process statuses may be determined from processes during their execution, or after they are already executed, based on the stored metadata. The additional data is defined to be stored at the metadata tables 160 and form the enhanced metadata 180. The type of metadata that is stored at the process exceptions structured metadata 380 is configurable, and the used data model may be updated based on a change in the requirements for determining a process status.

The determined process status result may be pre-defined set of statuses that correspond to a defined level of detail to provide meaningful information for analytic purposes. For example, a status giving general information whether a process has failed or passes successfully, may not be informative enough. However, information regarding the reason for failure may be meaningful for future improvements on the execution of processes and related activities performed over hardware and software components. For example, general statement statuses as suggested may not be useful for further analysis to determine root cause of failure. In one embodiment, the process statuses may be defined to relate a failure problem with an associated system/application and/or hardware equipment. The analytics layer 340 may provide implemented logic for determining process status results with detailed content, which can be used for future analysis.

When the process instances 315 are executed through the BPM Engine 310, there may be some execution steps performed on related systems, such as system 305. The execution of the process instances 315 generates storing of metadata at the metadata tables 375. The metadata tables 375 may correspond to the metadata tables 160, FIG. 1. The metadata tables 375 include metadata of process definitions 365, including task definitions 370 from corresponding process instances. The metadata tables 375 include process exception structured metadata 380, which extends metadata stored for the executions with data that may be evaluated to determine process status results that are useful for further analysis and evaluations.

The analytics layer 340 includes logic for determining the process status results based on the stored metadata at the metadata tables 375. The analytics layer 340 includes rules 335 defining conditions associated with attributes of data stored at the metadata tables 375. The analytics layer 340 includes also evaluation logic 345 that defines how to evaluate the rules 335 to determine process status results. When the evaluation logic 345 is triggered, then process status results 395 may be generated based on all of the process instances 315 that are run on the BPM Engine 310. The analytics layer 340 further includes aggregation logic 350, which allows for grouping and filtering of process instances with common behavior and characteristics.

A user 325 may send a request for providing analytics result over performance of process execution. The received request may include aggregation criteria 330. The aggregation criteria 330 may be a basis for structuring the result data over the performance of the process execution. Generating an aggregated result on such an aggregation criteria 330 may be suitable for determining a common point of failure of a set of the executed processes. For example, the aggregation criteria 330 may define that the request is associated with processes, which have completed successfully, and required some manual interaction for their completion.

In one embodiment, one request related to one or more processes with the aggregation criteria 330, is received at the analytics layer 340. The request is evaluated at the analytics layer based on the evaluation logic 345. The evaluation logic 345 analyses the metadata stored at the metadata tables 375 in relation to processes that are identified in the request. The identified processes may be processes that have finished their execution to their end, or which are currently under execution of some of their defined steps and tasks. The evaluation logic 345 defines a manner for searching and tracking metadata at the metadata tables 375 based on the rules 335. The rules 335 are defined to determine process status result based on evaluation of conditions related to the stored process exceptions at the process exceptions structured metadata 380. The metadata at the metadata tables 375 is grouped and/or filtered according to the received aggregation criteria 330 based on the aggregation logic 350. Based on the aggregation logic 350, the received request with the aggregation criteria 330 is interpreted. Based on the evaluation, results 385 are generated including process status results 395 and aggregation results 390. The results 385 may be provided to an external system. For example, the results 385 may be provided for further root cause analysis of process execution behavior.

Table 2 includes a representation of process status results 395 that may be provided based on the provided analytics layer 340 and the stored enhanced metadata at the metadata tables 375. The process status results 395 may be stored in different formats and saved as files on data storages. For example, the process status results 395 may include results for 5 processes that are being executed at the BPM Engine 310. The process status results 395 may be stored in one file of a JavaScript Object Notation (JSON) format.

TABLE 2

```
{
    "Date":"2016-08-16T10:55:46.005Z",
    "landscapeName":"DEV [dev022.platform.vendor.com]",
    "processInstances":[
        {
            "processInstanceId":"1023ff72-5fb6-11e6-af36-00163e05dc13",
            "triggeredOn":"2016-08-11T11:23:44Z",
            "elapsedTime":559753,
            "processDefinitionId":"a230f408-5d51-11e6-a48d-00163e05dc13",
            "triggerMedium":null,
            "triggeredBy":"D022495",
            "sid":"J7H",
            "status":"Succeeded",
            "currentStepName":null,
            "account":null,
            "correlationId":null,
            "numberOfRetries":0
        },
        {
            "processInstanceId":"263cf9df-62e2-11e6-9a5d-00163e05dc13",
            "triggeredOn":"2016-08-15T12:16:52Z",
            "elapsedTime":712531,
            "processDefinitionId":"a230f408-5d51-11e6-a48d-00163e05dc13",
            "triggerMedium":null,
            "triggeredBy":"I030662",
            "sid":"J2L",
            "status":"Succeeded",
            "currentStepName":null,
            "account":null,
            "correlationId":"95c79fe6-5499-4596-9334-4e318c74f5c1",
            "numberOfRetries":0
        },
        {
            "processInstanceId":"406034a5-606c-11e6-92d1-00163e05dc13",
            "triggeredOn":"2016-08-12T09:07:53Z",
            "elapsedTime":79448,
            "processDefinitionId":"provision.db.dedicate:2:a39d4230-5d83-11e6-a9b8-00163e05dc13",
            "triggerMedium":null,
            "triggeredBy":"I024151",
            "sid":"JRL",
            "status":"Succeeded",
            "currentStepName":null,
            "account":"shareddbms1",
            "correlationId":"5cc4b5cf-6123-480b-8d76-959301b748f0",
            "numberOfRetries":0
        },
```

TABLE 2-continued

```
{
    "processInstanceId":"80493799-6079-11e6-92d1-00163e05dc13",
    "triggeredOn":"2016-08-12T10:42:44Z",
    "elapsedTime":null,
    "processDefinitionId":"provision.db.cis:1:a1d0f9b0-5d51-11e6-a48d-00163e05dc13",
    "triggerMedium":null,
    "triggeredBy":"I024151",
    "sid":"JRN",
    "status":"Failed",
    "currentStepName":"PollDedicationProcessStatus",
    "account":"shareddbms1",
    "correlationId":"cdbe04c9-f24e-4510-a7e6-ab0d65913946",
    "numberOfRetries":1
}
```

Figure 4:
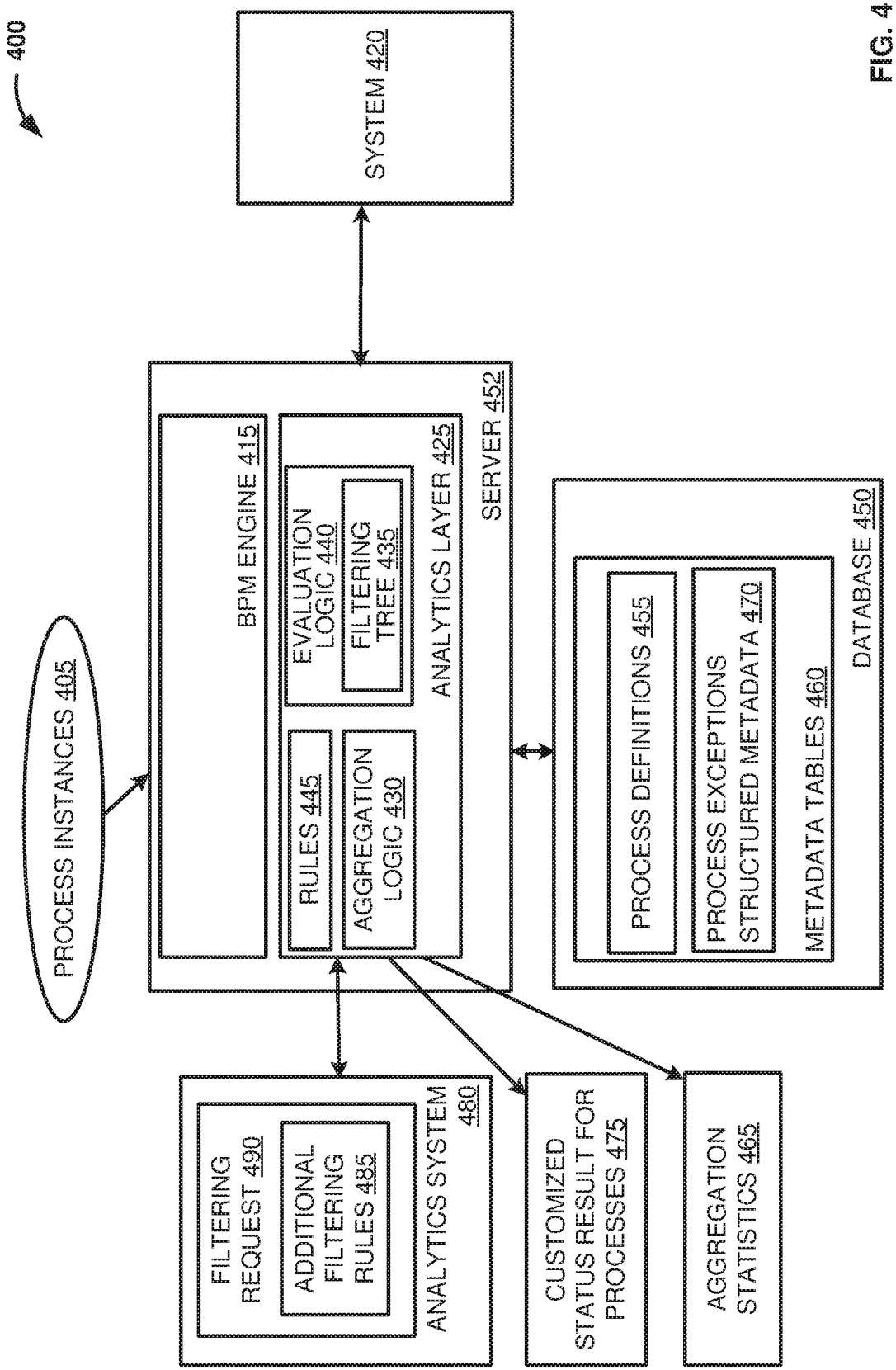
FIG. 4 is a block diagram illustrating a system for enhancing and aggregating data stored for executed processes to generate customized status results for processes, according to one embodiment.

FIG. 4 is a block diagram illustrating a system 400 for enhancing and aggregating data stored for executed processes to generate customized status results for processes, according to one embodiment. System 400 may be similar to system 300. System 400 defines an analytics layer 425 associated with a BPM Engine 415, which run on a server 452. The analytics layer 425 includes rules 445 and aggregation logic 430 that correspond to the rules 335 and aggregation logic 350. The analytics layer 425 includes evaluation logic 440, which defines a filtering tree 435. The filtering tree 435 represents a tree data structure suggesting different paths for determining process statuses based on evaluation of the rules 335. The rules 335 may be allocated in an order in the filtering tree 435, and process statuses may be defined as nodes. Leaf nodes for the filtering tree correspond to finalized process status results. However, based on a level of detail for the process status results, a node from a higher level of the tree structure may be used to provide a process status.

When process instances 405 are executed through the BPM Engine 415, some process steps are executed on related system 420. Based on executed process steps from the process instances 405, related metadata are stored in metadata tables 460. The stored metadata may be related to performed steps on the system 420. Such metadata may be stored in table format at the DB 450. The metadata that may be stored may correspond to the metadata stored at the DB 150, FIG. 1 and DB 360. FIG. 3. Such metadata may include data for the process definitions 455. Further, the DB 450 stores data for identification of the processes instances 405 and their execution. The stored metadata at metadata tables 460 includes process exceptions structured metadata 470 corresponding to the process exceptions structured metadata 380, FIG. 3, which extends an ordinarily history metadata for process execution.

In one embodiment, an analytics system 480 may establish a connection with the server 452. The analytics system 480 may provide functionality for data analysis over data associated with process execution. For example, through the analytics system 480 a request for data related to process execution and execution result statuses may be invoked and evaluated. A filtering request 490 is defined in the analytics system 480, which specifies one or more processes, for which process status result is requested. Received process status result may be further analyzed based on implemented analytics logic at the analytics system 480. The filtering request 490 may also include additional filtering rules 485, that are specific for a particular use case and scenario, for which analysis of process execution behavior is requested. For example, the additional filtering criteria may define that it should be checked whether if an additional rule, not specified in rules 445 is checked. An additional filtering rule from the additional filtering rules 485 may be associated with one or more rules from the rules 445 and may be associated with a leaf node from the filtering tree 435. The additional filtering rules 485 may also include defined customized process statuses to be determined based on evaluation of the rules. In such manner, the additional filtering rules 485 are evaluated in addition to rules from the rules 445 based on the evaluation logic 440.

In one embodiment, as a result from the received filtering request 490, a customized status result for processes 475 is generated. Additionally, aggregation statistics 465 may be generated as well. The aggregation statistics 465 may sort the generated customized status results and apply an aggregation criteria on top, to define separate use cases of process status execution behavior. The aggregation statistics 465 may be generated by default based on general aggregation criteria, as defined in aggregation logic 430. Additionally, aggregation statistics 465 may be defined based on a request defined and received from the analytics system 480. The aggregation statistics 465 and the customized status result for processes 475 may be provided into the analytics system 480. The analytics system 480 may include additional implemented logic for evaluation and analysis over the generated results. A user working with the analytics system 480 may generate different types of reports based on the received results.

Figure 5:
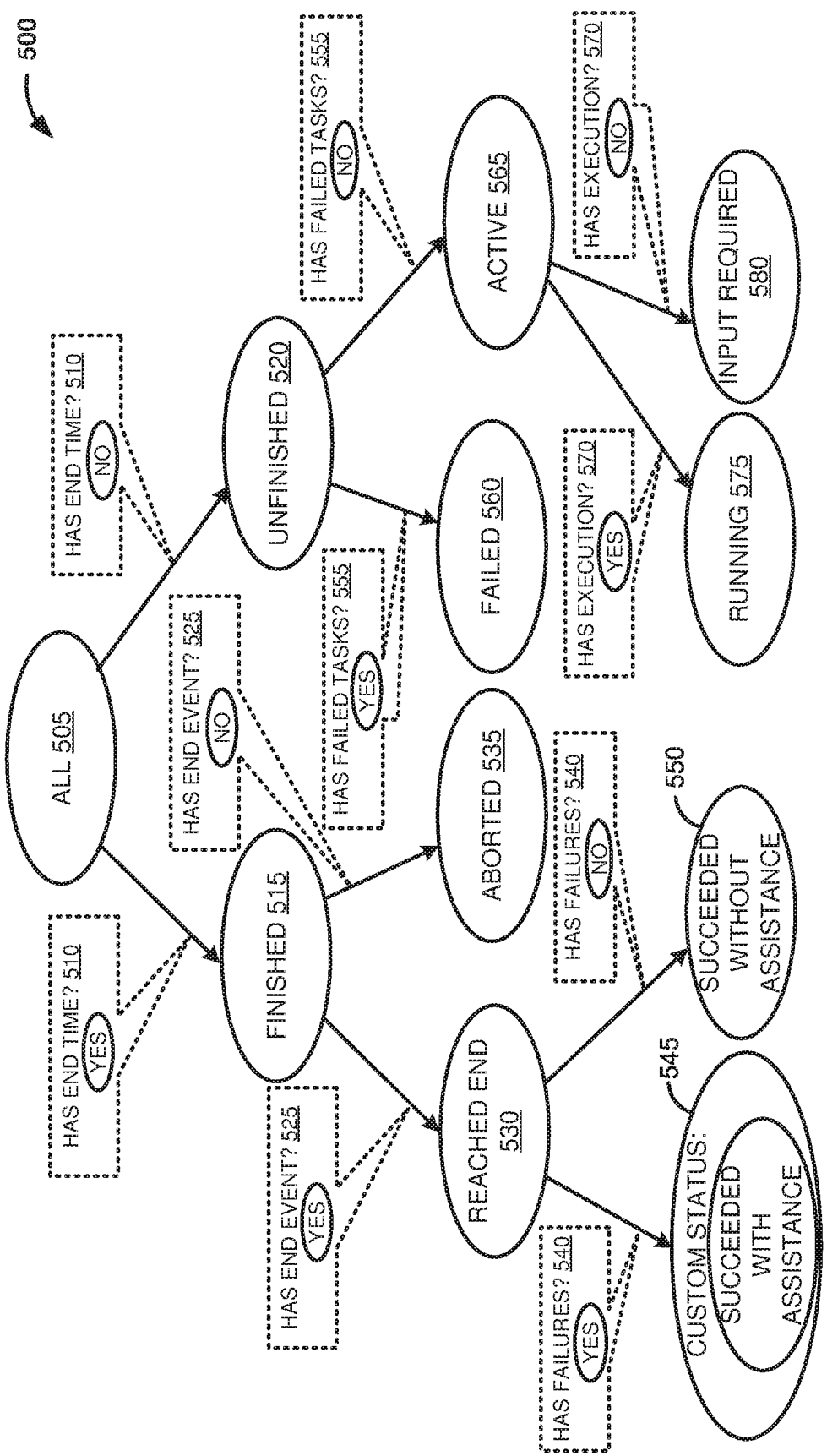
FIG. 5 is a block diagram illustrating a data structure for evaluating stored metadata for executed processes, according to one embodiment.

FIG. 5 is a block diagram illustrating a data structure 500 for evaluating stored metadata for executed processes, according to one embodiment. The data structure 500 is a tree data structure, which is used to iteratively determine the status of executed processes through evaluating rules, such as the rules 145 (FIG. 1), rules 335 (FIG. 3), rules 445 (FIG. 4). The data structure 500 may correspond to the filtering tree 435 described in FIG. 4. A node from the tree represents a status that may be defined at a current level of evaluation. An edge from the tree represents a rule to be evaluated. The defined rule at a given edge may be a Boolean statement, which may be evaluated to true and false, or yes and no. Such evaluation logic of iterative evaluations of rules according to a defined tree structure to determine a set of possible status results for process execution may be implemented in an evaluation logic defined at an analytics layer associated with a process engine. The evaluation logic, the rules, the process engine, and the process status results may be such as the evaluation logic described in relation to FIGS. 1, 2, 3, and 4.

The process statuses may be as defined in the nodes in the tree data structure 500. A root node "All" 505 is defined, which is a starting node for traversing the graph structure based on evaluation of defined rules at the tree edges. The process statuses may be extended to correspond to user requirements and defined analytics goals. The process statuses defined in the tree data structure 500 includes statuses such as "Finished" 515, "Unfinished" 520, "Reached End" 530, "Aborted" 535. "Failed" 560, "Active" 565, "Running" 575, "Input required" 580. The tree structure 500 includes rules at its edges, such as "Has end time?" 510, "Has end event?" 525, "Has failed tasks?" 555, "Has execution? 570, "Has Failures?" 540. The rules are denoted as simple human readable questions, however they may be specified as conditions related to attributes of metadata stored at metadata tables in a database, such as the metadata tables 460 in DB 450. FIG. 4. For example, the rule "Has failed tasks?" 555 may define an evaluation of data corresponding to a process execution under evaluation, and search for data related to tasks from the process. When data related to tasks from the process is identified, the data may be filtered to determine whether there is a task that has failed. For example, such information may be identified based on filtering on columns of data from the metadata table corresponding to the task statuses and a process identifier corresponding to the evaluated process.

The tree structure 500 may also include customized statuses that may be defined based on an external requirement, for example received from an external analytics system or an end-user. The custom statuses may be received together with additional filtering criteria, as discussed in FIG. 4 in relation to the filtering request 490. The tree structure 500 includes custom status 545 "Succeeded with assistance" and custom status 550 "Succeeded without assistance". These statuses 545 and 550 are defined based on evaluation of a rule 540—"Has failure?". The rule 540 suggests to evaluate whether the process under evaluation according to the tree structure has experienced failures, in case it is also labeled with the statuses "Finished" 515, and "Reached End" 530.

The statuses as defined in the nodes in the tree structure 500 are inherent as defined in the hierarchy of levels in the tree structure. If a process is finally defined with the status "Running" 575, this may be interpreted that the process also may be labeled with a status "Unfinished" 520, and a status "Active" 565. Statuses from a deeper level of the tree are more detailed and informative, which provide sufficient data to be used for future analytic purposes.

The various embodiments described above have a number of advantages. Providing an interface within a computer network associating applications, services, hardware systems, databases, etc., for monitoring and evaluation of process execution provides greater visibility over systems' performance. The storage of metadata at a database, according to an enhanced data model related to process execution, provides improvement over monitoring the performance of processes at different execution stages. Implementing logic for filtering of stored enhanced metadata, implemented through a filtering tree data structure defining paths for rules evaluation and determining process performance, improves on data manipulation. The generated information for executed processes may be represented at a user interface device of a client's application in the context of improved accuracy, usability, and efficiency in performance monitoring.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
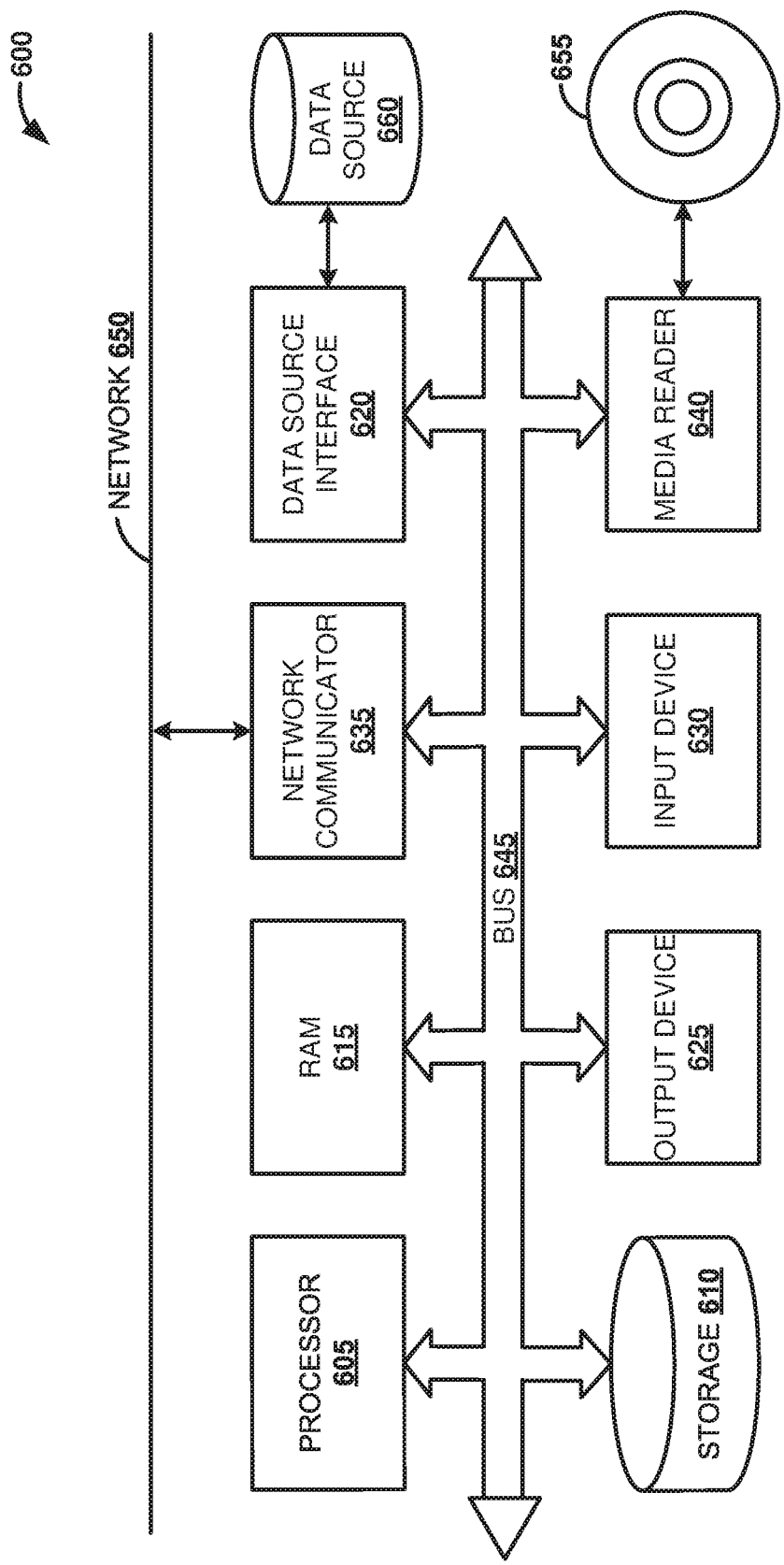
FIG. 6 is a block diagram illustrating an embodiment of a computing environment in which the techniques described for generating process status results, can be implemented.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to generate process status results for executed processes by a process engine, the method comprising:

providing an interface for process status determination for processes executed by a processor of the process engine, wherein the interface is associated with analytics rules for evaluation of process executions;

executing process instances by the processor of the process engine;

storing, in response to the executing of the process instances by the process engine, enhanced metadata for the executed process instances in a database table, the enhanced metadata being generated during the executing of the process instances by the process engine and includes process instance identifiers for tracking errors and exception behavior associated with a respective process instance of the executed process instances;

evaluating, by the processor, the enhanced metadata based on the analytics rules;

generating, by the processor, the process status results for the process instances executed by the process engine based on the evaluation of the enhanced metadata to determine a reason for the errors and exception behavior associated with the respective process instances of the evaluated enhanced metadata; and providing, by the processor, the generated process status results to an analytics system external to the process engine that processes the generated process results to generate a process monitoring report including an indication of a common point of failure for the process instances executed by the process engine and presents the report in a user interface of the analytics system.

2. The method of claim 1, wherein the process status determination is performed during process execution at the process engine, wherein the process engine executing the process instances is a business process management engine.

3. The method of claim 1, wherein the enhanced metadata is stored at a metadata table at a database in connection with the process engine and with the interface.

4. The method of claim 1, wherein the process status results are generated based on evaluation logic implemented at an analytics layer of the process engine, wherein the evaluation logic is based on the analytics rules for process evaluation.

5. The method of claim 4, further comprising:

generating an aggregation result based on evaluation of the generated process status results.

6. The method of claim 5, further comprising:

receiving aggregation criteria for generating the aggregation result; and evaluating the aggregation criteria within the analytics layer of the process engine.

7. A computer system to generate process status results for executed processes by a process engine, the system comprising:

a memory storing processor-executable instructions; and a processor to execute the processor-executable instructions in order to cause the system to:

provide an interface for process status determination for processes executed by a processor of the process engine, wherein the interface is associated with analytics rules for evaluation of process executions;

execute process instances by the processor of the process engine;

store, in response to the executing of the process instances by the process engine, enhanced metadata for the executed process instances in a database table, the enhanced metadata being generated during the executing of the process instances by the process engine and includes process instance identifiers for tracking errors and exception behavior associated with a respective process instance of the executed process instances;

evaluate, by the processor of the process engine, the enhanced metadata based on the analytics rules;

generate, by the processor of the process engine, the process status results for the process instances executed by the process engine based on evaluation of the enhanced metadata to determine a reason for the errors and exception behavior associated with the respective process instances of the evaluated enhanced metadata; and provide, by the processor of the process engine, the generated process status results to an analytics system external to the process engine that processes the generated process results to generate a process monitoring report including an indication of a common point of failure for the process instances executed by the process engine and presents the report in a user interface of the analytics system.

8. The system of claim 7, the process status determination is performed during process execution at the process engine, wherein the process engine executing the process instances is a business process management engine.

9. The system of claim 7, wherein the enhanced metadata is stored at a metadata table at a database in connection with the process engine and with the interface.

10. The system of claim 7, wherein the process status results are generated based on evaluation logic implemented at an analytics layer of the process engine, wherein the evaluation logic is based on the analytics rules for process evaluation.

11. The system of claim 10, further comprising instructions to:
  generate an aggregation result based on evaluation of the generated process status results.

12. The system of claim 11, further comprising instructions to:
  receive aggregation criteria for generating the aggregation result; and
  evaluate the aggregation criteria within the analytics layer of the process engine.

13. A non-transitory computer-readable medium storing instructions, which when executed cause a computer system to:

provide an interface for process status determination for processes executed by a processor of a process engine, wherein the interface is associated with analytics rules for evaluation of process executions;

execute process instances by the processor of the process engine;

store, in response to the executing of the process instances by the process engine, enhanced metadata for the executed process instances in a database table, the enhanced metadata being generated during the executing of the process instances by the process engine and includes process instance identifiers for tracking errors and exception behavior associated with a respective process instance of the executed process instances;

evaluating, by the processor of the process engine, the enhanced metadata based on the analytics rules;

generate, by the processor of the process engine, the process status results for the process instances executed by the process engine based on evaluation of the enhanced metadata to determine a reason for the errors and exception behavior associated with the respective process instances of the evaluated enhanced metadata; and provide, by the processor of the process engine, the generated process status results to an analytics system external to the process engine that processes the generated process results to generate a process monitoring report including an indication of a common point of failure for the process instances executed by the process engine and presents the report in a user interface of the analytics system.

14. The computer-readable medium of claim 13, wherein the process status determination is performed during process execution at the process engine, wherein the process engine executing the process instances is a business process management engine.

15. The computer-readable medium of claim 13, wherein the enhanced metadata is stored at a metadata table at a database in connection with the process engine and with the interface, and wherein the process status results are generated based on evaluation logic implemented at an analytics layer of the process engine, wherein the evaluation logic is based on the analytics rules for process evaluation.

16. The computer-readable medium of claim 15, further storing instructions to:
  generate an aggregation result based on evaluation of the generated process status results.

17. The computer-readable medium of claim 16, further storing instructions to:
  receive aggregation criteria for generating the aggregation result; and
  evaluate the aggregation criteria within the analytics layer of the process engine.

* * * * *